US008645064B2

(12) United States Patent
Bednar et al.

(10) Patent No.: US 8,645,064 B2
(45) Date of Patent: Feb. 4, 2014

(54) PRIORITIZED AND SUBJECTIVELY PERSONAL NAVIGATION

(75) Inventors: David L. Bednar, San Diego, CA (US); Babak Forutanpour, Carlsbad, CA (US); Devender A. Yamakawa, San Diego, CA (US); Daniel S. Baker, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 13/229,761

(22) Filed: Sep. 11, 2011

(65) Prior Publication Data

US 2013/0066551 A1    Mar. 14, 2013

(51) Int. Cl.
*G01C 21/00*    (2006.01)

(52) U.S. Cl.
USPC ...... 701/526; 340/309.16; 340/505; 342/457; 709/206

(58) Field of Classification Search
USPC .......... 701/211, 256; 340/309.16, 505, 539.1, 340/539.11, 539.13, 571, 573.1; 455/435.1, 455/456.3, 456.5, 456.1; 358/1.15, 402, 358/438, 440; 709/206, 230, 238, 239; 342/457; 700/197; 235/375; 711/147, 711/154
See application file for complete search history.

(56) References Cited

U.S. PATENT DOCUMENTS

| | | | |
|---|---|---|---|
| 7,819,315 B1 | 10/2010 | Pienkos | |
| 7,822,547 B2 | 10/2010 | Lindroos | |
| 2007/0106468 A1* | 5/2007 | Eichenbaum et al. | 701/211 |
| 2007/0124216 A1 | 5/2007 | Lucas | |
| 2008/0214204 A1 | 9/2008 | Ramer et al. | |
| 2010/0015994 A1 | 1/2010 | Mcbride et al. | |
| 2010/0022221 A1 | 1/2010 | Yi et al. | |
| 2010/0293106 A1 | 11/2010 | Rhoads et al. | |
| 2011/0143776 A1* | 6/2011 | Shankaranarayanan et al. | 455/456.3 |

FOREIGN PATENT DOCUMENTS

EP    2 1113 909 A1 *   4/2002

OTHER PUBLICATIONS

International Search Report and Written Opinion—PCT/US2012/052535—ISA/EPO—Apr. 5, 2013.

* cited by examiner

*Primary Examiner* — McDieunel Marc
(74) *Attorney, Agent, or Firm* — Fariba Yadegar-Bandari

(57) ABSTRACT

Apparatus and methods for recommending a navigation destination based upon recent updates are provided. The apparatus and methods include, in one or more aspects, receiving a request from a user communication device for a desired item, and associating a user location of the user communication device with a destination location of a provider of the desired item. Further, the one or more aspects include identifying a destination communication device at the destination location, and querying the destination communication device for a human-originating response to obtain a current accessibility status of the desired item. Additionally, the one or more aspects include reporting the destination location of the provider and the current accessibility status to the user communication device.

72 Claims, 9 Drawing Sheets

PRIORITIZED AND SUBJECTIVELY PERSONAL NAVIGATION

BACKGROUND

The present disclosure relates generally to communication, and more specifically to techniques for recommending location-based goods and services based upon real-time status information.

Wireless communication systems are fast becoming one of the most prevalent technologies in the digital information arena. Satellite and cellular telephone services and other wireless communication networks may already span the entire globe. Additionally, new wireless systems or networks of various types and sizes are added each day to provide connectivity among a plethora of devices, both fixed and portable. Many of these wireless systems are coupled together through other communication systems and resources to promote even more communication and sharing of information.

Another popular and increasingly important wireless technology includes navigation systems and, in particular, satellite positioning systems (SPS) such as, for example, the global positioning system (GPS) and other Global Navigation Satellite Systems (GNSS). SPS enabled devices, for example, may receive wireless SPS signals that are transmitted by orbiting satellites of a GNSS, and/or transmitted by other terrestrial based GNSS transmitting devices. The received SPS signals may, for example, be processed to estimate a location, altitude, and/or speed of the SPS enabled device.

Some devices and systems combine communication and navigation systems and services together. Thus, for example, a cellular phone device may also take advantage of location and navigation information and/or services. One increasingly popular service in this respect is to provide navigation information to a user through a portable electronic device operating in either a stand-alone mode or with assistance from other network-based devices. In this case, for example, a user may be provided with map or other directional information to help a user to navigate to a particular location or an address.

While such information can be quite useful, the mere location of a business or venue can often be insufficient. For instance, a user may want to know more about whether a desired good or service will be available upon arrival. For example, the business or venue could be closed, too busy to serve another customer, or lack inventory. Finding out a current status for accessibility of the desired good or service can be cumbersome, if not impractical, especially when occupied, such as when driving a vehicle. Also, often such information is not available or up-to-date through online resources, requiring someone at the business or venue to provide the information.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In one aspect, the present disclosure provides a method for recommending a navigation destination based upon recent updates. The method includes receiving a request from a user communication device for a desired item, associating a user location of the user communication device with a destination location of a provider of the desired item, and identifying a destination communication device at the destination location. The method further includes querying the destination communication device for a human-originating response to obtain a current accessibility status of the desired item, and reporting the destination location of the provider and the current accessibility status to the user communication device.

In another aspect, the present disclosure provides at least one processor for recommending a navigation destination based upon recent updates. A first module receives a request from a user communication device for a desired item. A second module associates a user location of the user communication device with a destination location of a provider of the desired item. A third module identifies a destination communication device at the destination location. A fourth module queries the destination communication device for a human-originating response to obtain a current accessibility status of the desired item. A fifth module reports the destination location of the provider and the current accessibility status to the user communication device.

In an additional aspect, the present disclosure provides a computer program product for recommending a navigation destination based upon recent updates. A non-transitory computer-readable storage medium stores instructions. At least one instruction causes a computer to receive a request from a user communication device for a desired item. At least one instruction causes the computer to associate a user location of the user communication device with a destination location of a provider of the desired item. At least one instruction causes the computer to identify a destination communication device at the destination location. At least one instruction causes the computer to query the destination communication device for a human-originating response to obtain a current accessibility status of the desired item. At least one instruction causes the computer to report the destination location of the provider and the current accessibility status to the user communication device.

In a further aspect, the present disclosure provides an apparatus for recommending a navigation destination based upon recent updates. The apparatus comprises means for receiving a request from a user communication device for a desired item. The apparatus comprises means for associating a user location of the user communication device with a destination location of a provider of the desired item. The apparatus comprises means for identifying a destination communication device at the destination location. The apparatus comprises means for querying the destination communication device for a human-originating response to obtain a current accessibility status of the desired item. The apparatus comprises means for reporting the destination location of the provider and the current accessibility status to the user communication device.

In yet another aspect, the present disclosure provides an apparatus for recommending a navigation destination based upon recent updates. A first interface receives a request from a user communication device for a desired item. A location component associates a user location of the user communication device with a destination location of a provider of the desired item. A selection component identifies a destination communication device at the destination location. A second interface queries the destination communication device for a human-originating response to obtain a current accessibility status of the desired item. The first interface further reports the destination location of the provider and the current accessibility status to the user communication device.

In another aspect, a method of obtaining a navigation destination based upon recent updates is provided. The method includes receiving, at a user communication device, a request for a desired item, and receiving a destination location of a provider of the desired item and a current accessibility status of the desired item. In this aspect, the destination location is associated with a user location of the user communication device, and the current accessibility status is based on identifying a destination communication device at the destination location and querying the destination communication device for a human-originating response to obtain the current accessibility status of the desired item.

In a further aspect, at least one processor for obtaining a navigation destination based upon recent updates is disclosed. The at least one processor includes a first module for receiving a request from a user communication device for a desired item. Further, the at least one processor also includes a second module for receiving a destination location of a provider of the desired item and a current accessibility status of the desired item. In this aspect, the destination location is associated with a user location of the user communication device. Further, in this aspect, the current accessibility status is based on identifying a destination communication device at the destination location and querying the destination communication device for a human-originating response to obtain the current accessibility status of the desired item.

In another aspect, a computer program product for obtaining a navigation destination based upon recent updates includes a non-transitory computer-readable storage medium for storing instructions. The instructions include at least one instruction for causing a computer to receive a request from a user communication device for a desired item. Further, the instructions include at least one instruction for causing the computer to receive a destination location of a provider of the desired item and a current accessibility status of the desired item. In this aspect, the destination location is associated with a user location of the user communication device. Also, in this aspect, the current accessibility status is based on identifying a destination communication device at the destination location and querying the destination communication device for a human-originating response to obtain the current accessibility status of the desired item.

In a further aspect, an apparatus for obtaining a navigation destination based upon recent updates is disclosed. The apparatus includes means for receiving a request from a user communication device for a desired item, and means for receiving a destination location of a provider of the desired item and a current accessibility status of the desired item. In this aspect, the destination location is associated with a user location of the user communication device. Further, in this aspect, the current accessibility status is based on identifying a destination communication device at the destination location and querying the destination communication device for a human-originating response to obtain the current accessibility status of the desired item.

In another aspect, an apparatus for obtaining a navigation destination based upon recent updates is disclosed. The apparatus includes a first interface configured to receive a request from a user communication device for a desired item and a second interface for receiving a destination location of a provider of the desired item and a current accessibility status of the desired item. In this aspect, the destination location is associated with a user location of the user communication device. Further, in this aspect, the current accessibility status is based on identifying a destination communication device at the destination location and querying the destination communication device for a human-originating response to obtain the current accessibility status of the desired item.

To the accomplishment of the foregoing and related ends, one or more aspects comprise the features hereinafter described in detail and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

The apparatus and methods described herein include, in one aspect, a current status agent that obtains up-to-date information on a desired item, that includes a good or a service, which otherwise can be time consuming and difficult to obtain. Going beyond merely locating destination locations on a Personal Navigation Device (PND) for the desired item, the current status agent queries a human at each destination location to ascertain a customer wait time or available inventory. In this manner, even small businesses or venues that do not offer an online status for automated access can participate in a service for assisting a user to find the desired item. Statuses of queries are reported to the PND, enabling a user to monitor progress of querying recommended providers for the desired item.

It should thus be appreciated with the benefit of the present disclosure that users are not bothered with making a call, or in some cases many calls, themselves, especially in the case where the users may be driving. For instance, the current status agent can interact with any provider of a desired item, such as a business, that has a conventional phone system. By assisting users in finding desired goods and services while avoiding an unnecessary trip or time spent calling, the apparatus and methods including the current status agent as described herein can provide value to both a user requesting the desired item and service providers providing the desired item. In addition, destination locations for several different desired items can be obtained and a route to the providers can be generated as part of the same trip.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
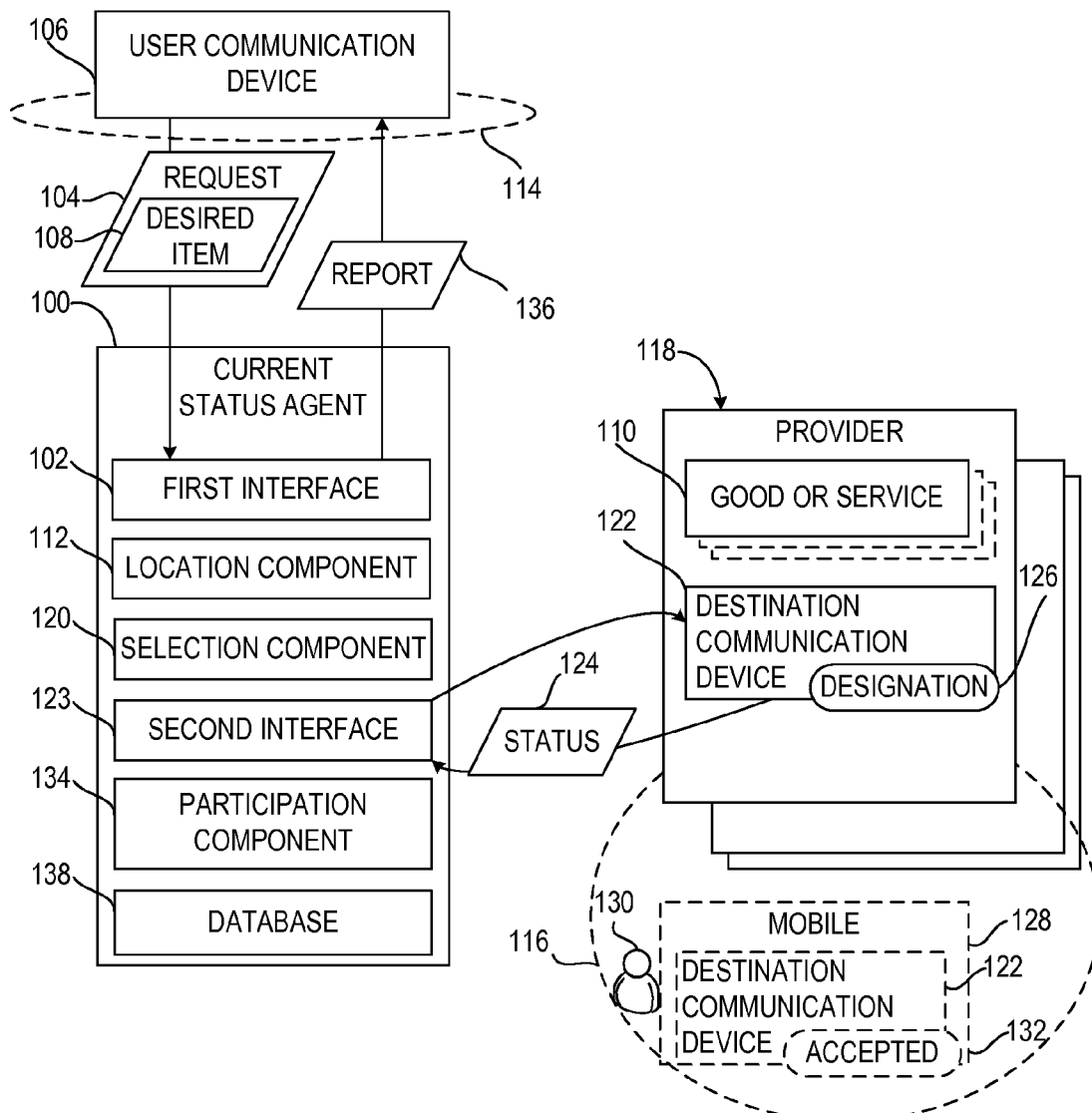
FIG. 1 depicts a schematic diagram of an apparatus for recommending a navigation destination based upon recent updates about accessibility of a desired item, according to one aspect.

In FIG. 1, in one aspect, the present apparatus and methods include a current status agent 100 for recommending a navigation destination based upon recent updates. A first interface 102 receives a request 104 from a user communication device 106, for example based on a user input, for a desired item 108, such as at least one good or service 110. A location component 112 associates a user location 114 of the user communication device 106 with at least one destination location 116 of at least one provider 118 of the good or service 110 corresponding to the desired item 108. For example, the association may be based on a distance, a travel time, etc., where the user location 114 may be, a current location, or an expected future location. A selection component 120 identifies a destination communication device 122 at the destination location 116. A second interface 123 queries the destination communication device 122 for a human-originating response via a voice call or interactive data session, etc., to obtain a current accessibility status 124 corresponding to the desired item 108. Current accessibility status 124 can include, but is not limited to, a customer wait time, an available inventory, open business hours or hours of operation, etc., of the good or service 110 corresponding to the desired item 108. The first interface 102 further provides a report 136, which may include the destination location 116 of the provider 118 and the current accessibility status 124, to the user communication device 106.

In one aspect, the selection component 120 may identify the destination communication device 122 based on a designation 126 by the provider 118, as described further below.

Alternatively or in addition to the destination communication device 122 being identified based on the designation 126 of the provider 118, the destination communication device 122 can also include a mobile communication device 128 determined to be at the destination location 116. For instance, this approach to obtaining the current accessibility status 124 can be in response to the second interface 123 unsuccessfully attempting to query the destination communication device 122 having the designation 126 as indicated by the provider 118. For example, in one aspect, a participating user 130 of the mobile communication device 128 accepts, as depicted at 132, to act as the destination communication device 122 in responding with the current accessibility status. In one aspect, the selection component 120 may identify mobile communication device 128 via the location component 112 determining that a location of the mobile communication device 128 corresponds with the location 116 of the participating user 130. It should be noted that selection component 120 may select mobile communication device 128 from a plurality of communication devices having locations corresponding to location 116, for example, based on one or more factors.

For example, in one aspect, a participation component 134 tracks participation by the plurality of participating users 130 in providing a status response and identifies the mobile communication devices 128 from among a plurality of devices corresponding to the plurality of participating users at least in part based upon a reliability of past participation. For instance, the participation component 134 can offer an incentive to the selected one of the plurality of mobile communication devices 128 to prompt obtaining the current accessibility status 124.

Further, in an aspect, the participating user 130 can be identified as a member of a social network that agrees to receive group or individual requests for information or recommendations. Alternatively or in addition, the participating user 130 can be a subscriber that receives navigation recommendations from the current status agent 100, or from another current status agent that is in a same network or that has a cooperative relationship with current status agent 100.

In some aspects, the current status agent 100 may access one or more of user, provider, or participant information to identify the user communication device 106 and/or the destination communication device 122. For example, the user, provider, and/or participant information can be accessed in a database 138.

Thus, in one aspect, it should be appreciated with the benefit of the present disclosure that the current status agent 100 provides an apparatus for recommending a navigation destination based upon recent updates. The first interface 102 is configured to receive the request 104 from the user communication device 106 for the desired item 108. The location component 112 associates a user location 114 of the user communication device 106 with the destination location 116 of the provider 118 of the good or service 110 that corresponds to the desired item 108. The selection component 120 identifies the destination communication device 122 at the destination location 116. The second interface 123 queries the destination communication device 122 for a human-originating response to obtain a current accessibility status 124 of the good or service 110 that corresponds to the desired item 108. The first interface 102 sends a report 136, for example including the destination location 116 of the provider 118 and the current accessibility status 124, to the user communication device 106.

Figure 2:
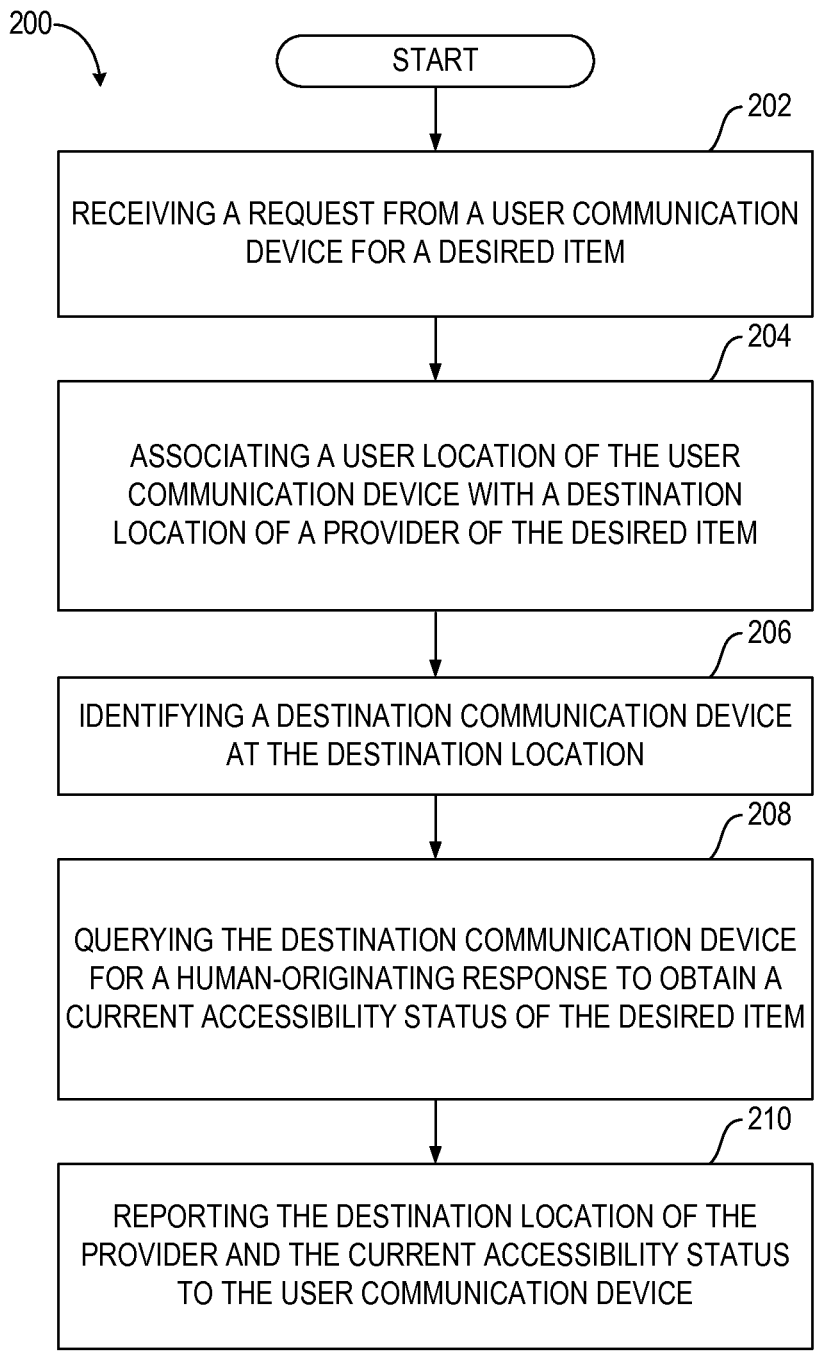
FIG. 2 depicts a flow diagram of a methodology for recommending a navigation destination based upon recent updates about accessibility of a desired item, according to one aspect.

In FIG. 2, the present disclosure provides a methodology 200 for recommending a navigation destination based upon recent updates, according to one aspect. For example, an apparatus such as the current status agent 100 (FIG. 1) can recommend a navigation destination based upon recent updates. The methodology 200 includes receiving a request from a user communication device for a desired item (block 202). For example, the first interface 102 of the current status agent 100 can be configured to receive the request 104 from the user communication device 106 for the desired item 108 of the one of the at least one good or service 110 (FIG. 1). The methodology 200 further includes associating a user location of the user communication device with a destination location of a provider of the desired item (block 204). For example, the location component 112 of the current status agent 100 associates the user location 114 of the user communication device 106 with the destination location 116 of the provider 118 of the desired item 108 (FIG. 1). Further, the methodology 200 includes identifying a destination communication device at the destination location (block 206). For example, the selection component 120 of the current status agent 100 identifies the destination communication device 122 at the destination location 116 (FIG. 1). Moreover, the methodology 200 includes querying the destination communication device for a human-originating response to obtain a current accessibility status of the desired item (block 208). For example, the second interface 123 of the current status agent 100 queries the destination communication device 122 for the human-originating response to obtain the current accessibility status 124 of the good or service 110 corresponding to the desired item 108 (FIG. 1). In addition, the methodology 200 includes reporting the destination location of the provider and the current accessibility status to the user communication device (block 210). For example, the first interface 102 of the current status agent 100 reports, as depicted at 136, the destination location 116 of the provider 118 and the current accessibility status 124 to the user communication device 106 (FIG. 1).

Alternatively or in addition, the destination communication device 122 may include one or more destination communication devices that are mobile communication devices 128 associated with one or more participating users 130 who communicate with current status agent 100 via their respective devices. For example, the selection component 120 identifies the destination communication device 122 by accessing respective locations for one or more participating users 130 of one or more respective mobile communication devices 128. For instance, this approach to obtaining the current accessibility status 124 can be in response to the second interface 123 unsuccessfully attempting to query the destination communication device 122 having the designation 126 as indicated by the provider 118.

In one aspect, a participation component 134 tracks participation by the plurality of participating users 130 in providing a status response and identifies the selected one of the plurality of mobile communication devices 128 at least in part based upon a reliability of past participation. For instance, the participation component 134 can offer an incentive to the selected one of the plurality of mobile communication devices 128 to prompt obtaining the current accessibility status 124.

According to one aspect, a participating user 130 can be identified as a member of a social network that agrees to receive group or individual requests for information or recommendations. The participating user 130 can be a subscriber that receives navigation recommendations from the current status agent 100.

In some implementations or scenarios, one-to-one mapping of a provider 118 to a destination communication device 122 (FIG. 1) may not be available. Thus, the identifying of the destination communication device at the destination location (block 206) can entail selection from more than one possible destination communication device.

With regard to the methodology 200 of FIG. 2, it should be noted that the methodology 200 may be implemented in one or more manners. For example, the implementation may include at least one of being implemented entirely by current status agent 100, which may be a network-based device in communication with user communication device 106, or entirely by user communication device 106 that incorporates a local version of current status agent 100, or in a distributed fashion with portions of the methodology 200 implemented by a network-based current status agent 100 and other portions of the methodology 200 implemented by user communication device 106, which may include a local version of all or some portion of current status agent 100. For example, in an aspect of a distributed implementation, user communication device 106 may obtain a navigation destination based upon recent updates by receiving, such as at a first interface of the user communication device 106, a request for a desired item (e.g., corresponding to block 202), and receiving, such as via a second interface and from a network-based portion of current status agent 100, a destination location of a provider of the desired item and a current accessibility status of the desired item (e.g., corresponding to block 210). In this distributed aspect of the methodology 200, the destination location is associated with a user location of the user communication device, and the current accessibility status is based on identifying a destination communication device at the destination location and querying the destination communication device for a human-originating response to obtain the current accessibility status of the desired item, such as by operation of the network-based portion of current status agent 100 (e.g., corresponding to blocks 204, 206, and 208).

Figure 3:
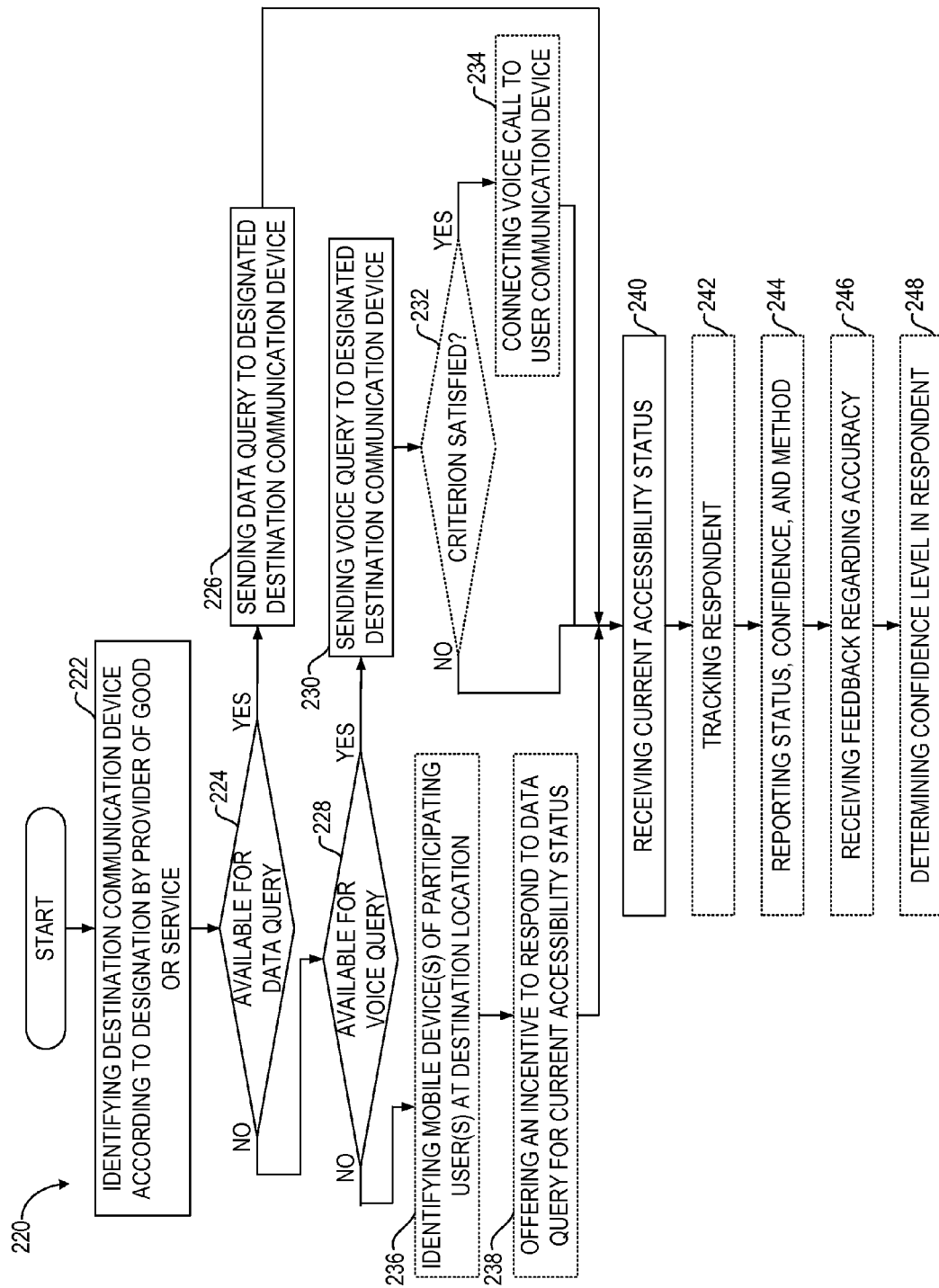
FIG. 3 depicts a flow diagram for identifying a destination communication device to query for a current accessibility status of a desired item, according to one aspect.

To that end, FIG. 3 depicts one aspect of an exemplary methodology 220 for identifying a destination communication device by selecting at least one of a plurality of destination communication devices for querying of a current accessibility status is described. In one aspect, the methodology 220 includes identifying a destination communication device according to a designation by the provider (block 222). For example, the selection component 120 of the current status agent 100 can identify the destination communication device 122 according to a designation 126 by the provider 118 (FIG. 1).

A determination is made as to whether the destination communication device according to the designation is available for responding to a data query for the current accessibility status (block 224). If so, in one aspect, the method may include querying the destination communication device by sending a data query to the destination communication device for prompting a user input (block 226). For example, the second interface 123 of the current status agent 100 queries the destination communication device 122 by sending an interactive data query (FIG. 1).

If the destination communication device is not available for a data query in block 224, then in an aspect a further determination is made as to whether the destination communication device according to the designation is available for responding to a voice query for the current accessibility status (block 228). If so, then the method may include querying the destination communication device by originating a voice call to the destination communication device (block 230). For example, the second interface 123 of the current status agent 100 queries the destination communication device 122 by making a voice call (FIG. 1). It should be noted that, in some aspects, the methodology 220 may first perform block 228 and then block 224.

Either the interactive data query or the voice call can pertain to eliciting a current accessibility status comprising a customer wait time for the desired item. Alternatively or in addition, the current accessibility status can comprise inventory information for the desired item.

In one aspect, during the voice call, the methodology 220 may include determining that the current accessibility status satisfies a criterion that includes reaching a human (block 232). If so, the user communication device is connected to the voice call (block 234). For example, the second interface 123 of the current status agent 100 determines during the voice call that the current accessibility status satisfies the criterion and that the voice call was received by a human (FIG. 1). Examples of the criterion may include, but are not limited to, failing to receive a Dial Tone Multifunction (DTMF) response or a DTMF response indicative that further information is required in order to provide the current accessibility status. Alternatively or in addition, an indication of a wait time or an available inventory that satisfies a threshold may satisfy the criteria to automatically connect the user communication device 106 via the first interface 102 (FIG. 1). For example, the user can confirm a reservation. Alternatively or in addition, an indication on the user communication device that the voice call is on-going can prompt the user to select to connect to the voice call. Alternatively or in addition, the destination communication device can request to speak directly to the user communication device.

If unsuccessful in block 228, then the methodology 220 may include identifying one or more alternate destination communication devices by matching respective locations for a plurality of participating users of a respective plurality of mobile communication devices with the destination location 116 (FIG. 1) of the provider 118 (FIG. 1). As such, at least one of a potential plurality of mobile communication devices is identified at the destination location to be the destination communication device (block 236). For example, the selection component 120 of the current status agent 100 may obtain respective locations for a plurality of mobile communication devices 128 and can identify a selected one of the plurality of mobile communication devices 128 at the destination location 116 (FIG. 1).

In some aspects, the methodology 220 may include offering an incentive to the selected one of the plurality of mobile communication devices in response to obtaining the current accessibility status (block 238).

In any case, the methodology 220 may include receiving the current accessibility status from at least one of a participating user of the selected mobile communication device at the destination location or from the destination communication device that was designated by the provider (block 240). Optionally, in some aspects, the methodology 220 may include tracking the communication device that responded to the query, e.g. the respondent (block 242). Optionally, in some aspects, the methodology 220 may include reporting the current accessibility status along with a confidence factor in the current accessibility status and a method used for obtaining the current accessibility status (block 244). Optionally, in some aspects, the methodology 220 may further include receiving feedback regarding the accuracy of the current accessibility status, such as from the user communication device (block 246). Optionally, in some aspects, the methodology 220 may also include determining a confidence level in the respondent (block 248). For example, then feedback from the user communication device that is associated with the current accessibility status may be used to update a reliability rating or confidence level associated with the respondent for use in future interactions.

In one aspect, the method may further include receiving a first request and a second request, each for different ones of goods or services, and querying providers respectively for both requests and reporting current accessibility statuses for both requests concurrently.

For either one request or multiple requests, the method may further include determining a preliminary route in a direction of one or more candidates for respective providers, e.g. a first provider and/or a second provider, of the desired item(s). The method may further include reporting the preliminary route to the user communication device while querying the respective providers. For example, the location component 112 can determine a preliminary route via the first interface 102 that correlates with a set of candidates for at least one of a first provider or a second provider of one or more desired items while the second interface 123 is querying the respective providers (FIG. 1).

Figure 4:
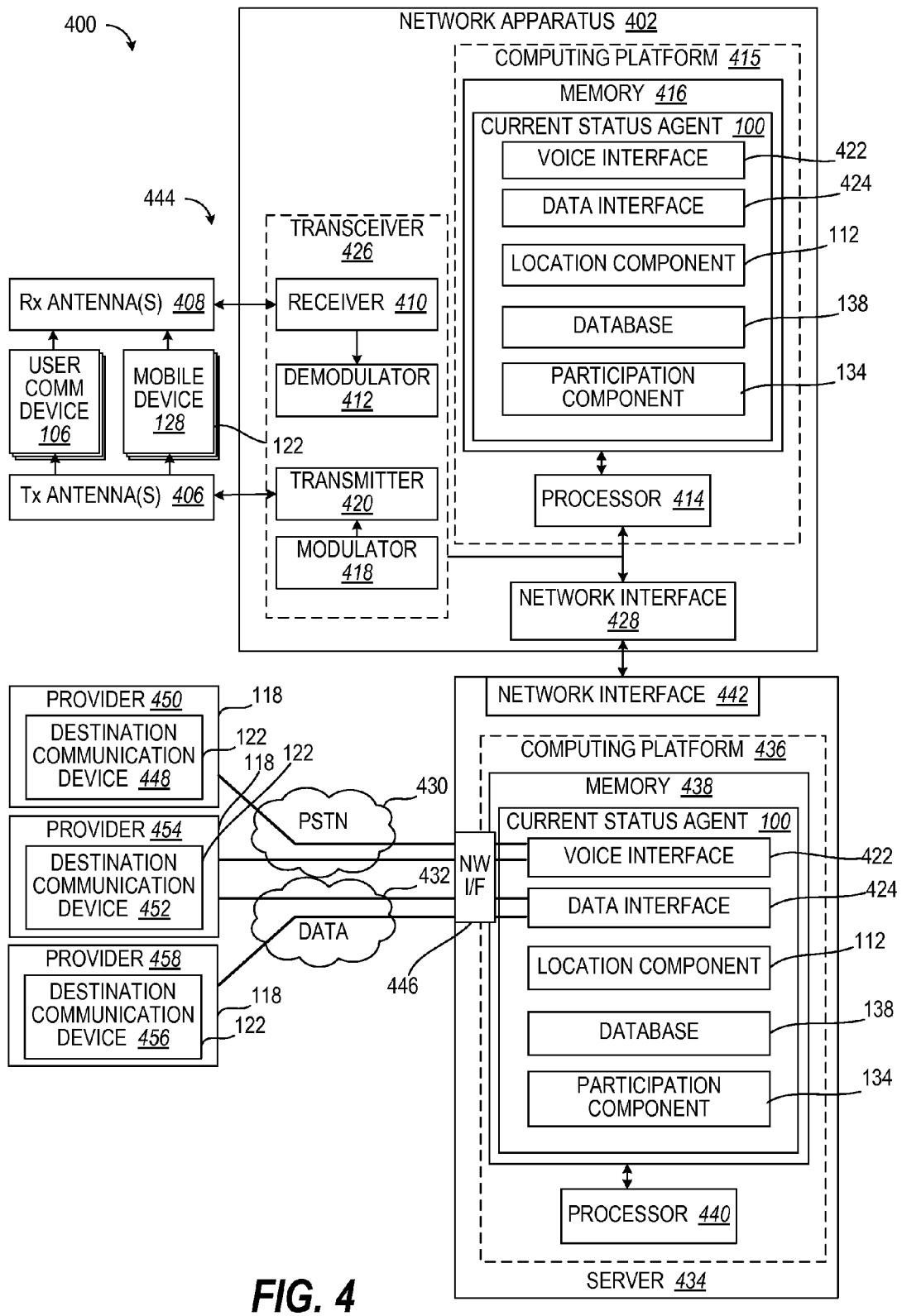
FIG. 4 illustrates a schematic diagram for a network apparatus employing a processing system for recommending a navigation destination based upon recent updates about accessibility of a desired item, according to one aspect.

FIG. 4 is a block diagram of a system 400 that can be utilized to implement various aspects of the functionality described herein. In one example, system 400 includes a network apparatus 402, such as a base node or base station, which can transmit and/or receive signal(s) from one or more mobile devices. The mobile devices may include at least one user communication device 106 and/or at least one mobile communication device 128 of a participating user 130. Additionally, network apparatus 402 can comprise a receiver 410 that receives information from antenna(s) 408. In one example, receiver 410 can be operatively associated with a demodulator 412 that demodulates received information. Demodulated symbols can then be analyzed by a processor 414. Processor 414 of a computing platform 415 can be coupled to memory 416, which can store data or program codes related to network apparatus 402. Additionally, network apparatus 402 can employ processor 414 to perform functions described herein such as the functions of the current status agent 100. Network apparatus 402 can also include a modulator 418 that can multiplex a signal for transmission by a transmitter 420 through antenna(s) 406.

In one aspect, the current status agent 100 supported by the computing platform 415 of the network apparatus 402 can include the location component 112, participation component 134, and database 138. Further, the current status agent 100 can include a voice interface 422 and a data interface 424 for eliciting a human-originated response to a voice call or interactive data query, respectively.

A transceiver 426 that includes the receiver 410, demodulator 412, transmitter 420, and modulator 418 can serve as the first interface 102 (FIG. 1) for communicating with the user communication device 106. For destination communication devices 122 (FIG. 1) that are mobile, which include a provider designated mobile device, the transceiver 426 can also serve as the second interface 123 (FIG. 1). Alternatively, a network interface 428 can communicate with a Publicly Switched Telephone Network (PSTN) 430 or a packet data network 432 to serve as the second interface 123 (FIG. 1).

Some or all functions of the current status agent 100 can be distributed and thus be remotely located relative to the network apparatus 402, such as in a remote apparatus depicted as a network server 434. In particular, a computing platform 436, memory 438, and processor 440 can support at least some of the components of the current status agent 100. A network interface 442 of the network server 434 can serve as the first interface 102 (FIG. 1) by communicating with the network interface 428 of an access network 444, represented by the network apparatus 402. For destination communication devices 122 (FIG. 1) that are mobile, which include a provider designated mobile device, the network interface 442 of the network server 434 can also serve as the second interface 123 (FIG. 1). Alternatively or in addition, a network interface 446 can comprise interconnections with the PSTN 430 and packet data network 432 to serve as the second interface 123 (FIG. 1) to destination communication devices 122 designated by providers 118. For example, the voice interface 422 via the network interface 446 and PSTN 430 can query a voice-only destination communication device 448 designated by a first provider 450. For another example, the voice interface 422 and the data interface 424 via the network interface 446 and PSTN 430 and packet data network 432 can query a voice and data destination communication device 452 designated by a first provider 454. For an additional example, the data interface 424 via the network interface 446 and packet data network 432 can query a data-only destination communication device 456 designated by a first provider 458.

Figure 5:
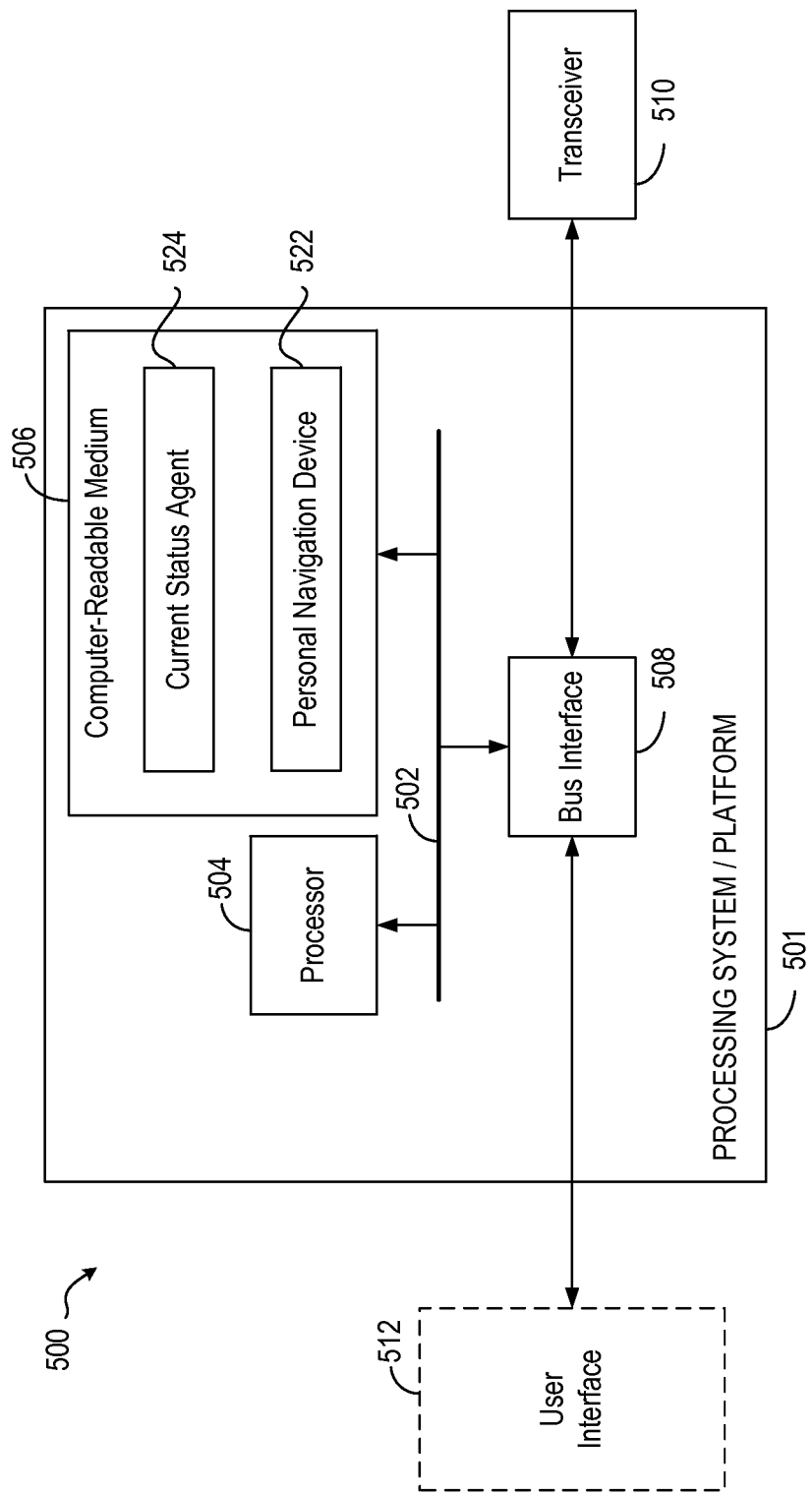
FIG. 5 illustrates a schematic diagram for a user apparatus employing a processing system for recommending a navigation destination based upon recent updates about accessibility of a desired item, according to one aspect.

FIG. 5 is a conceptual diagram illustrating an example of one aspect of an apparatus 500 employing a platform or processing system 501 for requesting and receiving recommendations for a navigation destination based upon recent updates about accessibility of a desired item. In this example, the processing system 501 may be implemented with bus architecture, represented generally by the bus 502. The bus 502 may include any number of interconnecting buses and bridges depending on the specific application of the processing system 501 and the overall design constraints. The bus 502 links together various circuits including one or more processors, represented generally by the processor 504, and computer-readable media, represented generally by the computer-readable medium 506. The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 includes one or more devices, such as a transmitter and a receiver, for communicating with various other apparatus over a transmission medium. Depending upon the nature of the apparatus, a user interface 512 may also be provided. Examples of the user interface 512 include but are not limited to a keypad, display, speaker, microphone, joystick, etc.

The processor 504 is responsible for managing the bus 502 and general processing, including the execution of software stored on the computer-readable medium 506. The software, when executed by the processor 504, causes the processing system 501 to perform the various functions described herein for any particular apparatus. The computer-readable medium 506 may also be used for storing data that is manipulated by the processor 504 when executing software. In an exemplary aspect, a personal navigation device (PND) application 522, such as a GNSS application, and a current status agent application 524, e.g. the same as or similar to current status agent 100 (FIG. 1), is stored in the computer-readable medium 506 and executed by the processor 504.

For example, the apparatus 500 can include the user communication device 106 (FIG. 1). The current status agent application 524 can include all of the functionality of the current status agent 100 (FIG. 1). Alternatively, the current status agent application 524 can include a client for the current status agent 100 (FIG. 1).

In another example, the apparatus 500 can include a network-based implementation wherein the current status agent application 524 is integrated with the PND application 522 to provide the functionality of both to a user communication device 106 (FIG. 1).

Figure 6:
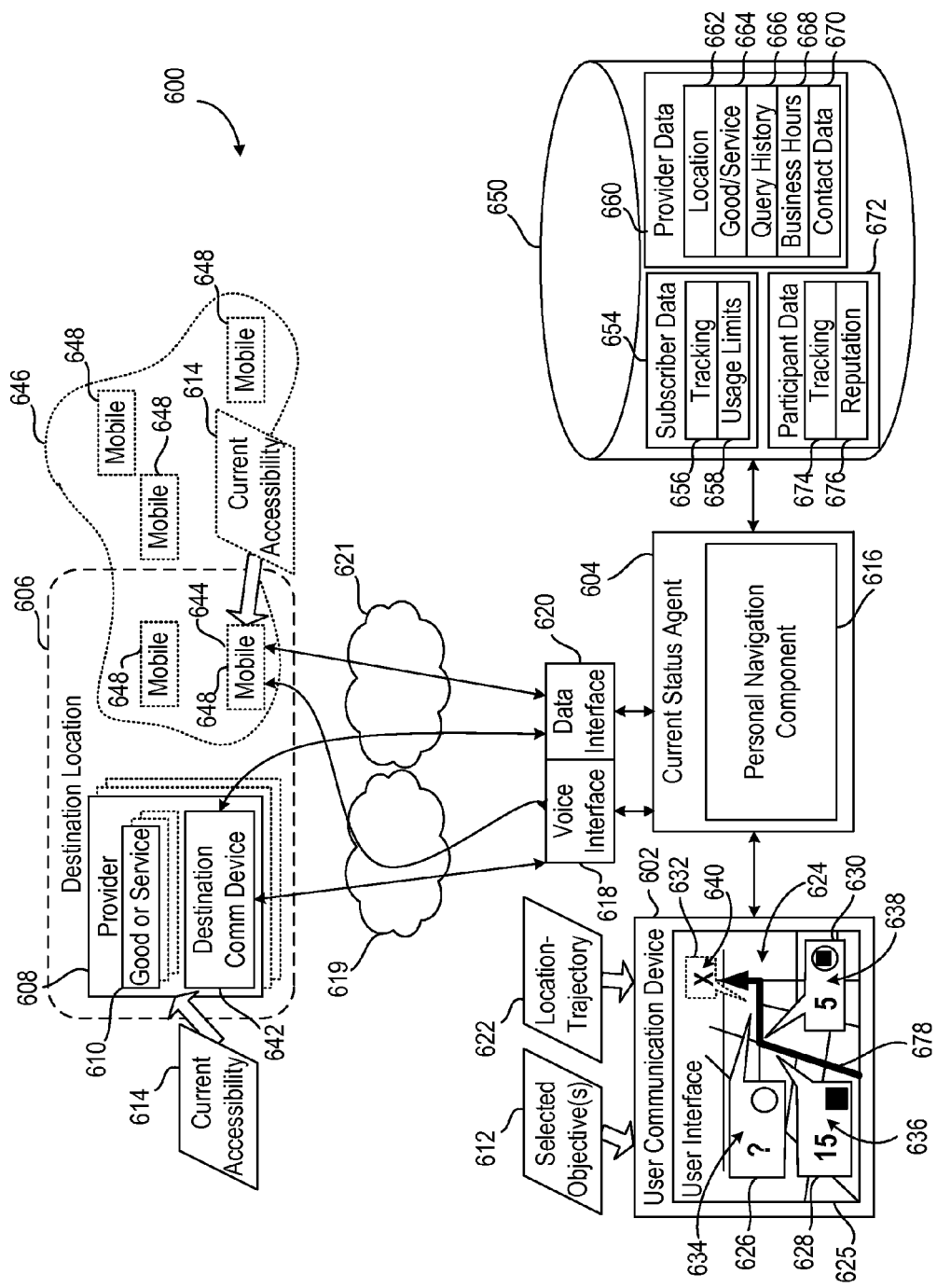
FIG. 6 depicts a detailed schematic diagram of a communication network having a current status agent for recommending a navigation destination based upon recent updates about accessibility of a desired item, according to one aspect.

In FIG. 6, in one aspect, an exemplary communication system 600 includes an apparatus such as a user communication device 602, which can be the user communication device 106 (FIG. 1). Further, in some aspects, user communication device 602 can further include a Personal Navigation Device (PND) or smartphone with PND capabilities, etc. The user communication device 602 can include or coordinate with a current status agent 604 for locating a destination location 606 of a provider 608 for locating goods and services 610 according to one or more selected objective(s) 612. Additionally, user communication device 602 can include or coordinate with a current status agent 604 for obtaining a current accessibility status 614 of the selected objective(s) 612. For example, in one aspect, current status agent 604 may be the same as or similar to the current status agent 100 (FIG. 1), provider 608 may be the same as or similar to the provider 118 (FIG. 1), one or more selected objective(s) 612 may be the same as or similar to desired item 108 (FIG. 1), and current accessibility status 614 may be the same as or similar to current accessibility status 124 (FIG. 1). In one aspect, the current status agent 604 has a personal navigation component 616 that interacts with current status agent 604 to obtain the destination location 606 of a provider 608 to output personal navigation information based on human-originating accessibility information for a good or service 610 corresponding to the one or more selected objective(s) 612.

For example, in an aspect, the current status agent 604 can send voice queries by originating a voice call via voice interface 618 over a network 619 that includes a Publicly Switched Telephone Network (PSTN). Alternatively or in addition, the current status agent 604 can send data queries by originating an interactive data session and sending data queries via a data interface 620 over a core network 621. For example, an interactive chat session can be initiated in order to obtain a response that originates with a human representative of the provider 608. As another example, the core network 621 can include a packet data network. For instance, the packet data network can include at least in part the Internet accessed over a wired network, wireless access point, or other via some other communication link. In one aspect, the voice call or data session is made directly with a representative of the respective provider of goods or services 610, such as the provider 608. For example, the representative can be a receptionist, hostess, customer service employee, etc.

In one aspect, the current status agent 604 can be implemented within the user communication device 602. In an aspect, provider data such as destination location 606, information on one or more goods or services 610, etc., can be provisioned on the user communication device 602 or retrieved. Alternatively, certain aspects or the entirety of the current status agent 604 can be distributed, such as on a network server.

In an exemplary aspect, the user communication device 602 is mobile, communicating via wireless or cellular access network; however, it should be noted that aspects of the present disclosure can be implemented in a fixed infrastructure. For a user communication device 602 that is mobile, location and trajectory information 622 is used to present a navigation display 624 on a user interface 625. In one aspect, input of the selected objective(s) 612 prompts a retrieval and display of candidate provider locations 626, 628, 630, and 632 with annotations 634, 636, 638, and 640, respectively, which can convey accessibility information by one or more of visual, audio or tactile indications as described below.

In one aspect, the current status agent 604 can identify a destination communication device 642 according to a designation by the provider 608, or a destination communication device 644 based on location. It should be appreciated that the destination communication devices 642, 644 can comprise the destination communication devices 122 of FIG. 1. For example the current status agent 604 can access publicly available directories or reference a managed database of providers 608 that have opted in or subscribed to receive the current status queries described herein. Further, the ability to automatically send a voice or data query to a human representative of a provider 608 can be utilized in advance of an actual navigation request to verify or update a managed database of providers 608, such as during off-peak business hours, to improve a rate of successfully obtaining a current status.

The query can be by a voice call using voice recognition, e.g. where audible user input may be converted to text or data or tones, or requesting Dial Tone Multi-Function (DTMF) keypad responses. Alternatively or in addition, the query can be by a data query. For example, the data query can be made via Short Message Session (SMS) texting, etc. The human-originating responses from the destination communication device 642 or 644 can be tracked for remuneration or for accuracy for assigning a confidence level to future responses by the provider 608. For example, the user can provide feedback after going to a recommended provider that can affect the confidence level or serve as a basis for being compensated for making the recommendation. Instances wherein no feedback is provided can also serve as a basis for remuneration or compensation, such as a count of how many times a particular provider is recommended or if it is detected that the user goes to a recommended destination location.

In one particular aspect, during the voice call, the current status agent 604 can determine that the current accessibility status satisfies a criterion and that the voice call was received by a human, and thus the current status agent 604 can connect the user communication device to the voice call. For example, the receiver of the call may not be clearly responsive to the query or may be asking for clarification, so the current status agent connects the user to the voice call session. As another example, the criterion can be a response indicating an acceptable wait time, whereupon the user is afforded an opportunity to make a reservation. As an additional example, the criterion can be available inventory, whereupon the user is afforded an opportunity to have an item placed on hold.

Alternatively or in addition to querying the destination communication device 642 according to a designation by the provider 608, the current status agent 604 can identify a destination communication device 644 by accessing respective locations for a plurality of participating users 646 of a plurality of mobile communication devices 648 and identifying a selected one of the plurality of mobile communication devices 648 at the destination location 606. Querying destination communication device 644, as opposed to the destination communication device 642 designated by the provider 608, can be in response to failing to identify or receive a response from the destination communication device 642. In particular, the current status agent 604 can unsuccessfully attempt to query the destination communication device 642 for the current accessibility status. Alternatively or in addition, the current status agent 604 may not find a designation for a destination communication device 642 by the provider 608.

Further, for instance, the selected one of the plurality of mobile communication devices 648 can be associated with a customer or patron of the business or venue. The current status agent 604 can access a data store 650 and track participation by the plurality of participating users 646 in providing a status response, and identify one or more of the corresponding plurality of mobile communication devices 648 at least in part based upon a reliability of past participation. In one aspect, reliability can be based at least in part upon feedback from the user communication device 602 that the current status provided was accurate or inaccurate. Alternatively or in addition, reliability can be based at least in part upon a quantity of responses made.

Optionally, in an aspect, the current status agent 604 can offer an incentive to the selected one of the plurality of mobile communication devices 648 to prompt obtaining the current accessibility status.

In order facilitate tracking by the current status agent 604, a data store 650 can include data structures such as subscriber data records 654, which for example can include tracking data 656 and usage limits 658. The data store 650 can include data structures such as provider data records 660, which for example can include location data 662, goods and services data 664, query history 666, business hours 668 and contact data 670. The contact data 670 can specify one or more designated destination communication devices. Additionally, the data store 650 can include data structures such as participant data records 672, which for example can include tracking data 674 and reputation data 676.

In one aspect, reporting the current accessibility status 614 can include determining a confidence factor in the current accessibility status and reporting the confidence factor to the user communication device.

In another aspect, the selection of the provider 608 can be based at least in part upon accessing data for hours of operation for the provider 608 and selecting the provider 608 based in part in response to determining that the hours of operation for the provider 608 coincide with a projected arrival time.

In one aspect, current status agent 604 can provide user communication device 602 with more than one provider for the selected good or service, thereby allowing the user to choose a desired provider. In addition, more than one type of good or service 610 can be selected. Thus, the current status agent 604 can further receive a second request from the user communication device 602 for a second desired item 610. In response, the current status agent 604 can associate an updated user location of the user communication device 602 with a second destination location of a second provider of the second desired item, identifying a second destination communication device at the second destination location, querying the second destination communication device for a human-originating response to obtain a second current accessibility status of the second desired item, and reporting the second destination location of the second provider and the second current accessibility status to the user communication device 602.

In one aspect, the user location includes an expected route 678. As such, destination locations can be selected that are along the expected route 680. Alternatively, the expected route 680 can be selected to position the user amongst a number of candidate providers so that the user can be begin or continue traveling while queries are underway.

Further, the current status agent 604 can determine and report route 678 to the user communication device 602. For instance, PND component 616 can be providing a route to the current status agent 604 or the current status agent 604 further provides the functionality of PND component 616 to the user communication device 602. In another example, the route 678 can correlate with a set of candidates for one or more providers while querying of providers continues. In another example, route 678 can be based upon a final destination that has been previously selected. Alternatively or in addition, route 678 can be based upon a predicted future location that is extrapolated from a current direction on a roadway. Alternatively or in addition, route 678 can be predicted upon a past pattern of commuting. Alternatively or in addition, route 678 can be based upon a first destination location already selected with a second destination location selected based on proximity to the route 678 between a current location and the first destination location. In an exemplary aspect, the route 678 includes a navigation route to a user-selected final destination with one or more recommended destination locations indicated as point annotations on route 678.

In order not to unnecessarily contact the business or venue, in some aspects, the current status agent 604 can further include accessing a previous response to a previous query for an accessibility status from the provider and using the previous accessibility status as the current accessibility status. In an aspect, for example, the current status agent 604 may use the previous accessibility status only after determining that the previous response occurred within a time threshold before a current time. Otherwise a new query may be made for the current accessibility status in response to determining that the previous response was outside of the time threshold.

In one aspect, candidates can be reported before the current accessibility status is obtained. Indications can be provided as to whether a current accessibility status is pending or is based on at least one of a previous query, a response to a voice call, online status retrieval, or a response from a customer user. Alternatively, the indication can be withheld until a verified accessibility is obtained. For example, it can be quickly determined that a provider is not open for business and the respective provider can be withheld, removed, or indicated as closed. Further, reporting the destination locations can indicate a selected one of a scheduled query, failed query, an ongoing query, or a successful query.

In one aspect, the current status agent 604 can include one or more degrees of service. For instance, the current status agent 604 can access subscription data 654, such as usage limits 658, associated with the user communication device 602. The current status agent 604 can base a number of providers available or selected for querying based upon the subscription data 654. For example, in one aspect, a first tier subscription can enable a user communication device 602 to query a defined number of providers per day, whereas a second tier subscription can enable querying a higher number of providers per day, or vice versa.

Figure 7:
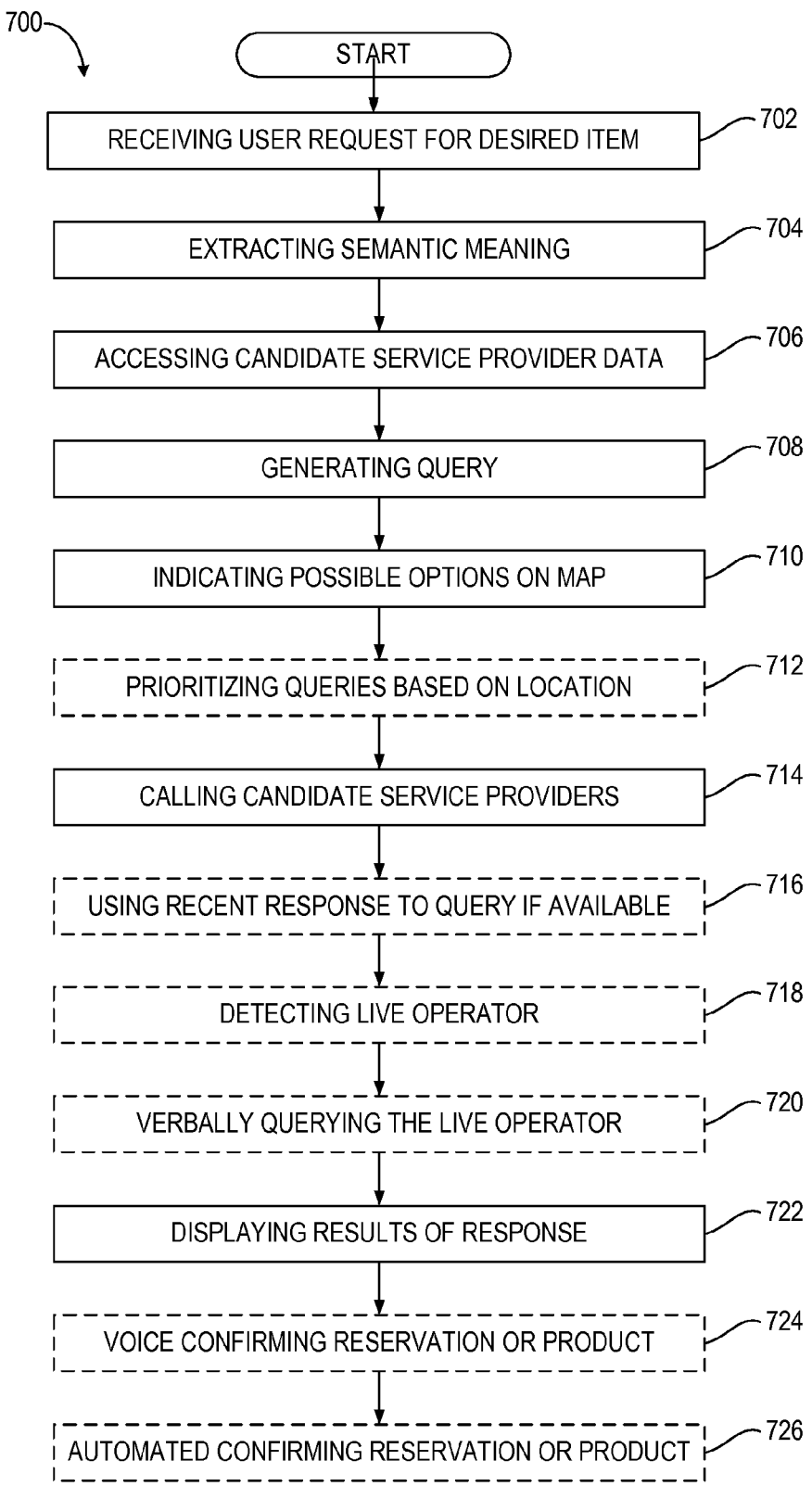
FIG. 7 depicts an flow diagram for an illustrative method of voice calling a provider of selected goods and service for current wait time or inventory availability for presentation on a Personal Navigation Device (PND), according to one aspect.

In FIG. 7, an illustrative method 700 is provided for one aspect of one use case, which should not be construed as limiting, for obtaining a current status for accessibility of one or more desired items based on a human-originating response from a provider. For instance, rather than calling all of the stores or restaurants or driving to a location without assurances, that the described aspects can function as a personal navigation device (PND) with a network communication capability to obtain current status information to find out whether it is worth making the trip for the desired item. While the online information about wait times, store hours, and inventory can be accessed, the described aspects augment a PND with a current status agent that can obtain information that is not readily available, such as information obtained via a call to someone at the business, store or venue.

For example, in one aspect, a user types or speaks a desired item into an apparatus including the PND and the current status agent (block 702). For example, the user can say "wait times at four star pizza restaurants in North County." The apparatus can employ a voice-to-text system to extract the semantic meaning of the query (block 704). The query is then processed to access candidate service provider data, such as a list of service providers, phone numbers, hours of operation, and to access query and response formats accepted by the service provider, etc. (block 706). For example, a service provider can accept a voice query and be expected to input a DTMF response or a verbal response. Alternatively, an SMS or email contact can be provided that is closely monitored. Thus, an internal database can be accessed that constructs or provides an action based on a query, for example <store><phone #><request>, or <BJsPizza><760-877-9000><"What is wait time? Press 2 digits to signify # of minutes.>. In an exemplary aspect, a query is generated and sent to a live operator capable of providing up-to-date information, such as by determining a DTMF keypad sequence to get past an automated answering system (block 708).

In one aspect, the apparatus can display the possible candidate service provider options on a map while the candidate service providers are being queried (block 710). In an aspect, for example, the possible candidate service provider options may further include the progress of the queries, thereby enabling a user to decide to begin travelling in the general direction of one or more candidate service providers. Optionally, in an aspect, candidates can be prioritized for querying and displaying based upon proximity to a current location, and/or other factors such as user preference, reliability, etc. (block 712). Meanwhile, calling begins for each candidate service provider, e.g. a business, store, or venue, and the calling may occur in series or in parallel (block 714). For example, Voice over Internet Protocol (VOIP) can be used over a packet switched network to call a plurality or all of the establishments at once. For efficiency and to avoid unnecessary disturbance for the recipients, tracking of queries made to the candidates can be used so that a recent similar query can be used as a response to the current query (block 716).

Further, in some aspects, during each of the calls, the method may include detecting for a live operator (block 718). Once detected, in some aspects, a verbal query can be provided, such as by playing an outgoing message (block 720). For example, the outgoing message may be a pre-recorded message. In one aspect, which should not be construed as limiting, the following outgoing message could be played: "We have a patron who would like to eat at your restaurant. What is the average wait time? Please press the digits on your phone for total number of minutes followed by the pound sign. For example, two followed by five would mean twenty-five minutes." Alternatively, a voice interface can perform voice to text conversion. As another example, the recipient can be prompted to respond with a keypad or voice entry if a certain item is in stock or not.

Based on a DTMF or voice response, the apparatus displays the results of the responses to the queries (block 722). Icons or annotations, for instance, can be color coded based on received response data, such as total wait times. In an aspect, the voice call may be maintained and the user can be prompted to connect to the call in order to perform one or more actions, such as but not limited to, providing clarifying information, placing their name on a wait list, or providing information to secure the desired item until their arrival, for example (block 724). Alternatively, in an aspect, a user interface on the apparatus can allow the user to prompt an automated follow-up to the service provider (block 726). For example, on an apparatus with a touch screen display and in the case of the desired item being a restaurant reservation, the user can touch over an icon of the restaurant that is presented on the display. Then, either in their own voice or via a response stored on the apparatus, the user can leave their name and a number of guests in their party in order to hold the reservation.

Figure 8:
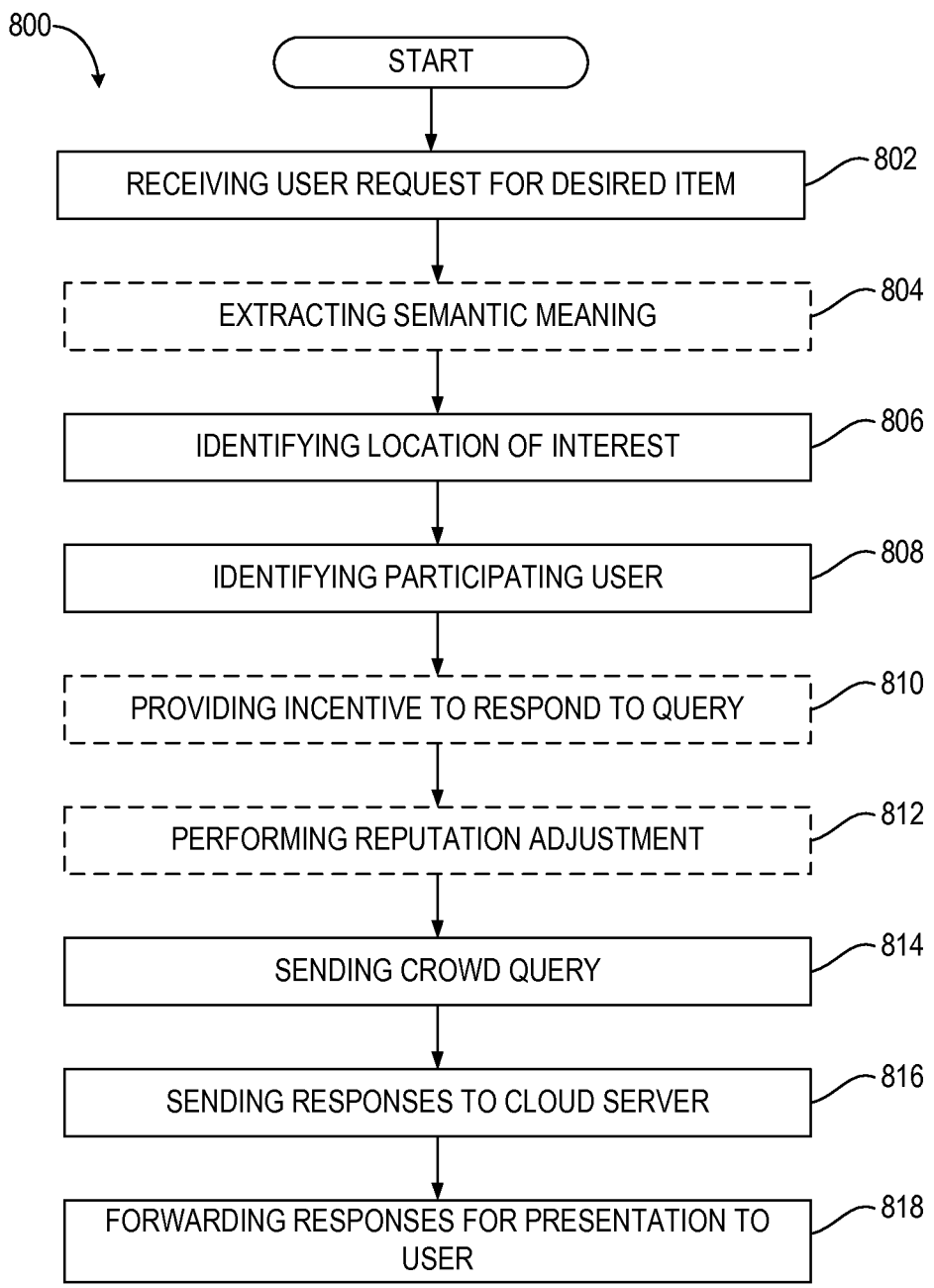
FIG. 8 depicts a flow diagram for an illustrative method of data querying or voice calling participating devices at a location of a provider of a desired item for current wait time or inventory availability for presentation on a PND, according to one aspect.

In FIG. 8, a methodology 800 is depicted for one aspect of one use case, which should not be construed as limiting, for obtaining current accessibility information from someone who happens to be in the service provider, e.g. the business, store or venue, based upon matching the location of his/her mobile device with the provider location. For example, the designated contact at the destination can be busy or proven to be untrustworthy. Thus, the query can be "crowd sourced" by posing the question to one or more people at the destination via their mobile device. In the alternative or in addition, the crowd sourcing can be performed in parallel to contacting the designated communication device.

Initially, the user can type or speak the user's query for a desired item into an apparatus including PND and current access agent functionality (block 802). For example, "How long is the line at Alpha Movie Theater for Beta Movie?" The apparatus can employ a voice-to-text system to transform the spoken query into a text string (block 804). The location of interest is determined from the query (block 806). One or more participating users at the location may be identified based on current location information corresponding to the communication devices of the one or more participating users (block 808). For example, the location information may be, but is not limited to, GNSS information or "check-in" data from existing location-based social network services. The method may further include providing an incentive to respond to the query (block 810). For instance, the user generating the query or the network may provide a small micro-payment as incentive to other users to answer the query, such as by phrasing the query to include an incentive. For example, in one aspect, the query can be something like the following: "How long is the line at Alpha Movie Theater for Beta Movie? Will pay twenty-five cents for the first answer." As another example, "Do you see any purple sweaters in size small on the shelves at Gamma Store? Will pay fifty cents for first answer." The micro-payment could be monetary, achievement points, loyalty points, or some other form of digital or virtual currency. The micro-payment may use a declining scale based upon elapsed time, such as full value in the first few minutes, and a smaller amount sometime after the first few minutes. Optionally, in some aspects, reputation adjustments can also be used as an incentive, and/or for targeting recipients of the query (block 812).

The query can be sent to one or more users at the location on their mobile phone or other connected device (block 814). Responses to the query, such as one or more of text, photo, video, audio, etc., responses, are then received, such as but not limited to receiving responses at a network server (block 816). In turn, the responses are forwarded to the apparatus for presentation, display, playback, etc. to the user (block 818). For example, a text-to-speech system can be used so that the user can be driving yet obtain the information in the responses as the responses are received.

Figure 9:
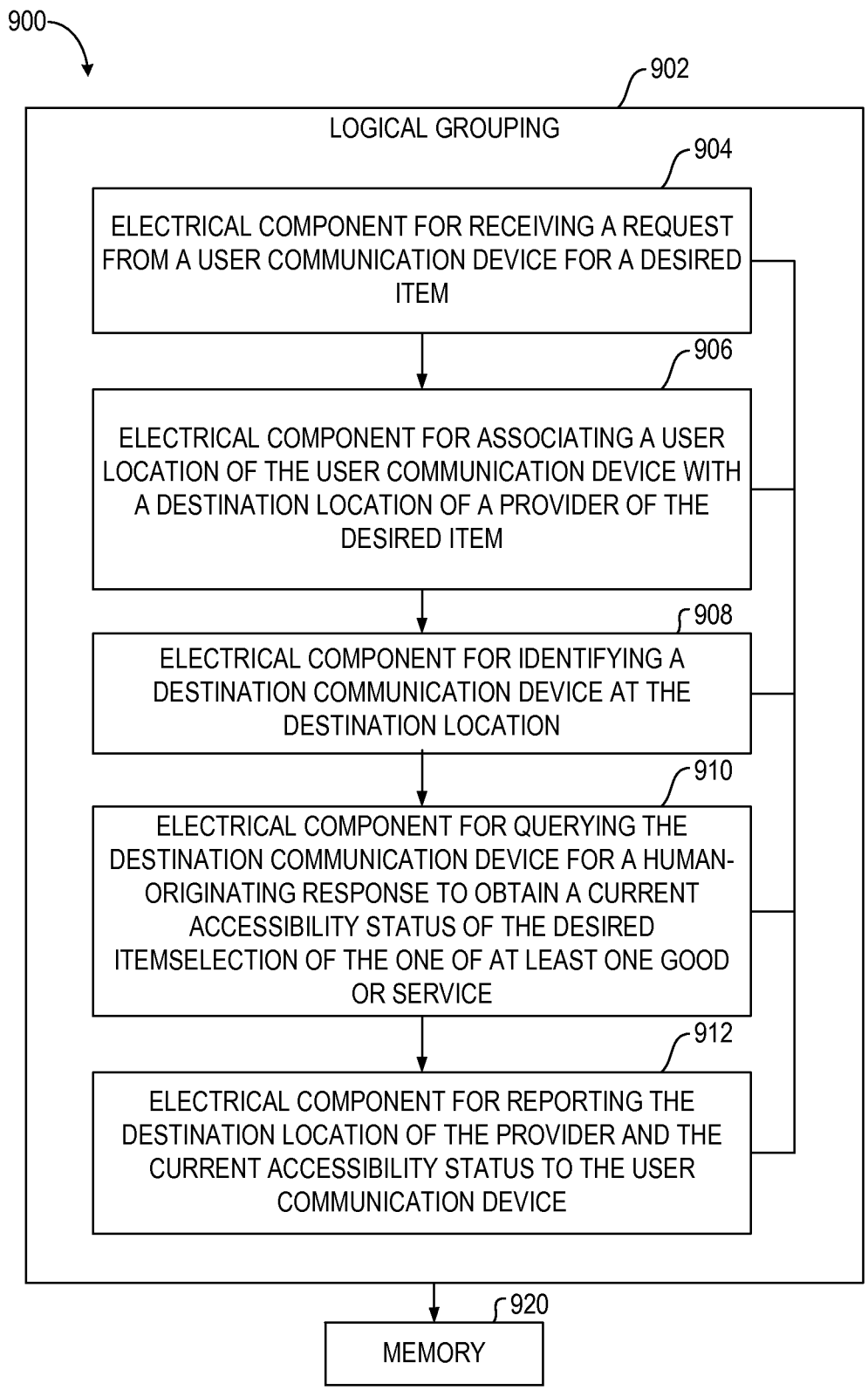
FIG. 9 depicts a block diagram of a logical grouping of electrical components for recommending a navigation destination based upon recent updates about accessibility of a desired item, according to one aspect.

With reference to FIG. 9, illustrated is a system 900 for recommending a navigation destination based upon recent updates. For example, system 900 can reside at least partially within a network, within a user device, or distributed between both a network and a user device. It is to be appreciated that system 900 is represented as including functional blocks, which can be functional blocks that represent functions implemented by a computing platform, processor, software, or combination thereof such as firmware. System 900 includes a logical grouping 902 of electrical components that can act in conjunction. For instance, logical grouping 902 can include an electrical component 904 for receiving a request from a user communication device for a desired item. Moreover, logical grouping 902 can include an electrical component 906 for associating a user location of the user communication device with a destination location of a provider of the desired item. Further, logical grouping 902 can include an electrical component 908 for identifying a destination communication device at the destination location. In addition, logical grouping 902 can include an electrical component 910 for querying the destination communication device for a human-originating response to obtain a current accessibility status of the desired item. As another instance, logical grouping 902 can include an electrical component 912 for reporting the destination location of the provider and the current accessibility status to the user communication device. Additionally, system 900 can include a memory 920 that retains instructions for executing functions associated with electrical components 904-912. While shown as being external to memory 920, it is to be understood that one or more of electrical components 904-912 can exist within memory 920.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component," "module," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices. Examples include a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices such as hard disk, floppy disk, magnetic strip, etc., optical disks such as compact disk (CD), digital versatile disk (DVD), etc., smart cards, and flash memory devices. Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for recommending a navigation destination based upon recent updates, comprising:
    receiving a request from a user communication device for a desired item;
    associating a user location of the user communication device with a destination location of a provider of the desired item;
    identifying a destination communication device at the destination location;
    querying the destination communication device for a human-originating response to obtain a current accessibility status of the desired item; and
    reporting the destination location of the provider and the current accessibility status to the user communication device.

2. The method of claim 1, wherein identifying the destination communication device further comprises identifying the destination communication device according to a designation by the provider.

3. The method of claim 1, wherein identifying the destination communication device further comprises:
    accessing respective locations for a plurality of participating users of a plurality of mobile communication devices; and
    identifying a selected one of the plurality of mobile communication devices at the destination location.

4. The method of claim 3, further comprising:
    tracking past participation by the plurality of participating users in providing a status response,
    wherein identifying the selected one of the plurality of mobile communication devices further comprises identifying at least in part based upon a reliability of the past participation.

5. The method of claim 3, further comprising offering an incentive to the selected one of the plurality of mobile communication devices in response to obtaining the current accessibility status.

6. The method of claim 1, wherein identifying the destination communication device further comprises:
    unsuccessfully attempting to query a communication device according to a designation by the provider for the current accessibility status;
    accessing respective locations for a plurality of participating users of a respective plurality of mobile communication devices; and
    identifying a selected one of the plurality of mobile communication devices at the destination location.

7. The method of claim 1, wherein querying the destination communication device further comprises sending a data query to the destination communication device for prompting a user input.

8. The method of claim 1, wherein querying the destination communication device further comprises originating a voice call to the destination communication device.

9. The method of claim 8, further comprising:
during the voice call, determining that the current accessibility status satisfies a criterion and that the voice call was received by a human; and
connecting the user communication device to the voice call.

10. The method of claim 1, wherein the current accessibility status comprises a customer wait time for the desired item.

11. The method of claim 1, wherein the current accessibility status comprises inventory information for the desired item.

12. The method of claim 1, wherein reporting the current accessibility status further comprises:
determining a confidence factor in the current accessibility status; and
reporting the confidence factor to the user communication device.

13. The method of claim 1, further comprising:
accessing data defining hours of operation for the provider; and
selecting the provider based in part in response to determining that the hours of operation for the provider coincide with a projected arrival time.

14. The method of claim 1, wherein the request comprises a first request, the desired item comprises a first desired item, the destination location comprises a first destination location, the provider comprises a first provider, and the destination communication device comprises a first destination communication device, the method further comprising:
receiving a second request from the user communication device for a second desired item, wherein the second desired item is different from the first desired item;
associating an updated user location of the user communication device with a second destination location of a second provider of the second desired item;
identifying a second destination communication device at the second destination location;
querying the second destination communication device for a human-originating response to obtain a second current accessibility status of the second desired item; and
reporting the second destination location of the second provider and the second current accessibility status to the user communication device.

15. The method of claim 14, further comprising:
determining a preliminary route in a direction of one or more candidates for either the first provider or the second provider; and
reporting the preliminary route to the user communication device while querying providers.

16. The method of claim 1, further comprising:
associating a subsequent location of the user communication device at the destination location; and
tracking the association for remuneration from the provider.

17. The method of claim 1, further comprising:
receiving a user input from the user communication device regarding an accuracy of the current accessibility status; and
assigning a confidence level to the provider based at least in part upon the user input.

18. The method of claim 17, further comprising reporting the destination location with an indication of the confidence level for the provider to the user communication device.

19. The method of claim 1, wherein querying the provider to obtain the current accessibility status further comprises:
accessing a previous response, to a previous query, including a previous accessibility status from the provider;
using the previous accessibility status as the current accessibility status after determining that the previous response was within a time threshold before a current time; and
wherein the query further comprises a new query for the current accessibility status after determining that the previous response was outside of the time threshold.

20. The method of claim 1, wherein reporting the destination location further comprises indicating whether the current accessibility status is based on at least one of a previous query, a response to a voice call, an online status retrieval, or a response from a customer user.

21. The method of claim 1, wherein receiving the request from the user communication device further comprises converting an audible user input to text.

22. The method of claim 1, further comprising:
accessing a subscription status associated with the user communication device; and
selecting the provider from a number of providers available for querying, wherein the number of providers is selected based upon the subscription status.

23. The method of claim 1, wherein the user location comprises a predicted future location.

24. The method of claim 1, wherein reporting the destination location further comprises indicating the destination location prior to obtaining the current accessibility status, wherein the indicating further includes an annotation representing at least one of a scheduled query, a failed query, an ongoing query, or a successful query.

25. At least one processor for recommending a navigation destination based upon recent updates, comprising:
a first module configured to receive a request from a user communication device for a desired item;
a second module configured to associate a user location of the user communication device with a destination location of a provider of the desired item;
a third module configured to identify a destination communication device at the destination location;
a fourth module configured to query the destination communication device for a human-originating response to obtain a current accessibility status of the desired item; and
a fifth module configured to report the destination location of the provider and the current accessibility status to the user communication device.

26. A non-transitory computer-readable medium for recommending a navigation destination based upon recent updates, comprising:
at least one instruction for causing a computer to receive a request from a user communication device for a desired item;
at least one instruction for causing the computer to associate a user location of the user communication device with a destination location of a provider of the desired item;
at least one instruction for causing the computer to identify a destination communication device at the destination location;
at least one instruction for causing the computer to query the destination communication device for a human-originating response to obtain a current accessibility status of the desired item; and at least one instruction for causing the computer to report the destination location of the provider and the current accessibility status to the user communication device.

27. An apparatus for recommending a navigation destination based upon recent updates, comprising:
   means for receiving a request from a user communication device for a desired item;
   means for associating a user location of the user communication device with a destination location of a provider of the desired item;
   means for identifying a destination communication device at the destination location;
   means for querying the destination communication device for a human-originating response to obtain a current accessibility status of the desired item; and
   means for reporting the destination location of the provider and the current accessibility status to the user communication device.

28. An apparatus for recommending a navigation destination based upon recent updates, comprising:
   a first interface configured to receive a request from a user communication device for a desired item;
   a location component configured to associate a user location of the user communication device with a destination location of a provider of the desired item;
   a selection component configured to identify a destination communication device at the destination location;
   a second interface configured to query the destination communication device for a human-originating response to obtain a current accessibility status of the desired item; and
   wherein the first interface is further configured to report the destination location of the provider and the current accessibility status to the user communication device.

29. The apparatus of claim 28, wherein the selection component is further configured to identify the destination communication device by identifying the destination communication device according to a designation by the provider.

30. The apparatus of claim 28, wherein the selection component is further configured to identify the destination communication device by:
   accessing respective locations for a plurality of participating users of a plurality of mobile communication devices; and
   identifying a selected one of the plurality of mobile communication devices at the destination location.

31. The apparatus of claim 30, further comprising a participation component configured to track participation by the plurality of participating users in providing a status response, and to identify the selected one of the plurality of mobile communication devices based at least in part upon a reliability of past participation.

32. The apparatus of claim 31, wherein the participation component is further configured to offer an incentive to the selected one of the plurality of mobile communication devices to prompt obtaining the current accessibility status.

33. The apparatus of claim 28, wherein the selection component is further configured to identify the destination communication device by:
   accessing respective locations for a plurality of participating users of a respective plurality of mobile communication devices in response to the second interface unsuccessfully attempting to query the communication device according to a designation by the provider for the current accessibility status; and
   identifying a selected one of the plurality of mobile communication devices at the destination location.

34. The apparatus of claim 28, wherein the second interface is further configured to query the destination communication device by sending a data query to the destination communication device for prompting a user input.

35. The apparatus of claim 28, wherein the second interface is further configured to query the destination communication device by voice calling the destination communication device.

36. The apparatus of claim 35, wherein the second interface is further configured for voice calling by determining during the voice call that the current accessibility status satisfies a criterion and that the voice call was received by a human, and
   wherein the first interface is further configured to connect the user communication device to the voice call via the second interface.

37. The apparatus of claim 28, wherein the current accessibility status comprises a customer wait time for the desired item.

38. The apparatus of claim 28, wherein the current accessibility status comprises inventory information for the desired item.

39. The apparatus of claim 28, wherein the first interface is further configured to report the current accessibility status by:
   determining a confidence factor in the current accessibility status; and
   reporting the confidence factor to the user communication device.

40. The apparatus of claim 28, wherein the selection component is further configured to access data for hours of operation for the provider and select the provider based in part in response to determining that the hours of operation for the provider coincide with a projected arrival time.

41. The apparatus of claim 28, wherein the request comprises a first request, the selection comprises a first desired item, the destination location comprises a first destination location, the provider comprises a first provider, the destination communication device comprises a first destination communication device,
   wherein the first interface is further configured to receive a second request from the user communication device for a second desired item;
   wherein the location component is further configured to associate an updated user location of the user communication device with a second destination location of a second provider of the second desired item;
   wherein the selection component is further configured to identify a second destination communication device at the second destination location;
   wherein the second interface is further configured to query the second destination communication device for a human-originating response to obtain a second current accessibility status of the second desired item; and
   wherein the first interface is further configured to report the second destination location of the second provider and the second current accessibility status to the user communication device.

42. The apparatus of claim 41, wherein the location component is further configured to determine a preliminary route via the first interface that correlates with a set of candidates for either the first provider or the second provider while the second interface is querying providers.

43. The apparatus of claim 28, further comprising a participation component configured to associate a subsequent location of the user communication device at the destination location, and to track the association for remuneration from the provider.

44. The apparatus of claim 28, further comprising a participation component configured to receive a user input from the user communication device regarding an accuracy of the current accessibility status, and to assign a confidence level to the provider based at least in part upon the user input.

45. The apparatus of claim 44, wherein the first interface is further configured to report the destination location with an indication of the confidence level for the provider.

46. The apparatus of claim 28, wherein the second interface is further configured to access a previous response to a previous query for an accessibility status from the provider, to use the accessibility status as the current accessibility status in response to determining that the previous response was within a time threshold before a current time, and to make a new query for the current accessibility status in response to determining that the previous response was outside of the time threshold.

47. The apparatus of claim 28, wherein the first interface is further configured to report the destination location by indicating whether the current accessibility status is based on at least one of a previous query, a response to a voice call, an online status retrieval, or a response from a customer user.

48. The apparatus of claim 28, wherein the first interface is further configured to receive the request from the user communication device by performing voice recognition.

49. The apparatus of claim 28, wherein the selection component is further configured to access a subscription status associated with the user communication device, and to base a number of providers selected for querying based upon the subscription status.

50. The apparatus of claim 28, wherein the user location comprises a predicted future location.

51. The apparatus of claim 28, wherein the first interface is further configured to report the destination location by indicating the destination location prior to obtaining the current accessibility status with an annotation for a selected one of a scheduled query, failed query, an ongoing query, or a successful query.

52. A method of obtaining a navigation destination based upon recent updates, comprising:
   receiving, at a user communication device, a request for a desired item; and
   receiving a destination location of a provider of the desired item and a current accessibility status of the desired item, wherein the destination location is associated with a user location of the user communication device, and wherein the current accessibility status is based on identifying a destination communication device at the destination location and querying the destination communication device for a human-originating response to obtain the current accessibility status of the desired item.

53. The method of claim 52, wherein the destination communication device is identified, at least in part, based on at least one of a designation by the provider, or based on identifying one of a plurality of mobile communication devices at the destination location, or based on a reliability of past participation by the destination communication device in providing a status response.

54. The method of claim 52, wherein the current accessibility status comprises at least one of a customer wait time or inventory information for the desired item.

55. The method of claim 52, further comprising receiving a confidence factor in the current accessibility status.

56. The method of claim 52, wherein the provider is selected, at least in part, based on a determination that hours of operation for the provider coincide with a projected arrival time of the user communication device, or based on a subscription status of the user communication device.

57. The method of claim 52, further comprising receiving a user input regarding an accuracy of the current accessibility status for use in assigning a confidence level to the provider based at least in part upon the user input.

58. The method of claim 52, wherein the current accessibility status includes an indication that the current accessibility status is based on at least one of a previous query, a response to a voice call, an online status retrieval, or a response from a customer user.

59. The method of claim 52, wherein receiving the request further comprises converting an audible user input to text.

60. The method of claim 52, wherein receiving the destination location further comprises receiving the destination location prior to obtaining the current accessibility status, further comprising receiving an indication with the destination location that includes an annotation representing at least one of a scheduled query, a failed query, an ongoing query, or a successful query.

61. At least one processor for obtaining a navigation destination based upon recent updates, comprising:
   a first module configured to receive a request from a user communication device for a desired item; and
   a second module configured to receive a destination location of a provider of the desired item and a current accessibility status of the desired item, wherein the destination location is associated with a user location of the user communication device, and wherein the current accessibility status is based on identifying a destination communication device at the destination location and querying the destination communication device for a human-originating response to obtain the current accessibility status of the desired item.

62. A non-transitory computer-readable medium for obtaining a navigation destination based upon recent updates, comprising:
   at least one instruction for causing a computer to receive a request from a user communication device for a desired item; and
   at least one instruction for causing the computer to receive a destination location of a provider of the desired item and a current accessibility status of the desired item, wherein the destination location is associated with a user location of the user communication device, and wherein the current accessibility status is based on identifying a destination communication device at the destination location and querying the destination communication device for a human-originating response to obtain the current accessibility status of the desired item.

63. An apparatus for obtaining a navigation destination based upon recent updates, comprising:
   means for receiving a request from a user communication device for a desired item; and
   means for receiving a destination location of a provider of the desired item and a current accessibility status of the desired item, wherein the destination location is associated with a user location of the user communication device, and wherein the current accessibility status is based on identifying a destination communication device at the destination location and querying the destination communication device for a human-originating response to obtain the current accessibility status of the desired item.

64. An apparatus for obtaining a navigation destination based upon recent updates, comprising:
- a first interface configured to receive a request from a user communication device for a desired item; and
- a second interface configured to receive a destination location of a provider of the desired item and a current accessibility status of the desired item, wherein the destination location is associated with a user location of the user communication device, and wherein the current accessibility status is based on identifying a destination communication device at the destination location and querying the destination communication device for a human-originating response to obtain the current accessibility status of the desired item.

65. The apparatus of claim 64, wherein the destination communication device is identified, at least in part, based on at least one of a designation by the provider, or based on identifying one of a plurality of mobile communication devices at the destination location, or based on a reliability of past participation by the destination communication device in providing a status response.

66. The apparatus of claim 64, wherein the current accessibility status comprises at least one of a customer wait time or inventory information for the desired item.

67. The apparatus of claim 64, wherein the second interface is further configured to receive a confidence factor in the current accessibility status.

68. The apparatus of claim 64, wherein the provider is selected, at least in part, based on a determination that hours of operation for the provider coincide with a projected arrival time of the user communication device, or based on a subscription status of the user communication device.

69. The apparatus of claim 64, wherein the first interface is further configured to receive a user input regarding an accuracy of the current accessibility status for use in assigning a confidence level to the provider based at least in part upon the user input.

70. The apparatus of claim 64, wherein the current accessibility status includes an indication that the current accessibility status is based on at least one of a previous query, a response to a voice call, an online status retrieval, or a response from a customer user.

71. The apparatus of claim 64, wherein the first interface for receiving the request is further configured to convert an audible user input to text.

72. The apparatus of claim 64, wherein the second interface is further configured to receive the destination location prior to the current accessibility status, wherein the destination location further includes an annotation representing at least one of a scheduled query, a failed query, an ongoing query, or a successful query.

* * * * *